United States Patent [19]
Kanie

[11] Patent Number: 5,551,817
[45] Date of Patent: Sep. 3, 1996

[54] FASTENER FOR ATTACHING IN ONE DIRECTION

[75] Inventor: Hideki Kanie, Toyohashi, Japan

[73] Assignee: Emhart Inc., Newark, Del.

[21] Appl. No.: 253,871

[22] Filed: Jun. 3, 1994

[30] Foreign Application Priority Data

Jun. 4, 1993 [JP] Japan ............... 5-030024 U

[51] Int. Cl.⁶ ............ F16B 19/00; F16B 37/08; F16B 39/00
[52] U.S. Cl. ............ 411/107; 411/339; 411/433; 411/508
[58] Field of Search ............ 411/107, 338, 411/339, 433, 437, 508–510, 913

[56] References Cited

U.S. PATENT DOCUMENTS

| | | | |
|---|---|---|---|
| 3,252,677 | 5/1966 | Raymond | 411/510 X |
| 4,573,844 | 3/1986 | Smith | 411/107 X |
| 4,846,611 | 7/1989 | Sadri et al. | 411/339 X |
| 4,913,609 | 4/1990 | Mauer | 411/107 X |
| 5,302,070 | 4/1994 | Kameyama et al. | 411/508 X |

*Primary Examiner*—Neill R. Wilson
*Attorney, Agent, or Firm*—E. D. Murphy

[57] ABSTRACT

A fastener 1 includes a stud 2 and a nut 3. The stud comprises a shank 21 having a breakable portion 22 at a mid portion thereof, a resilient section 24 formed at one end of the shank, a nut engagement portion including a threaded portion 28 extending up to the breakable portion along the shank, and a flange 23 disposed between the end of the shank and the nut engagement portion. The nut comprises an axial hole to allow the shank of the stud to pass therethrough, resilient engagement pawls 35 on the inner wall of the axial hole for resilient-engagement with the nut engagement portion of the stud, and a flange receiving surface 37 to abut upon the flange of the stud. The stud is inserted into holes of panels with the engagement section being inserted first and the nut is fitted over the stud with the flange receiving surface facing the panels. The shank is then drawn to break the breakable portion.

4 Claims, 6 Drawing Sheets

FASTENER FOR ATTACHING IN ONE DIRECTION

FIELD OF THE INVENTION

The present invention relates to a fastener to be used, for example, to connect panels together or to mount a component on a panel. Particularly, the present invention relates to a fastener for attaching in one direction.

DESCRIPTION OF THE PRIOR ART

A tapping screw is used to mount a component on a panel in the automobile industry, for example. The tapping screw is usually used together with a grommet. The grommet is inserted into a mounting hole in the panel and a mounting hole of the component to be mounted is positioned to the grommet hole. Then, the tapping screw is driven into the grommet by means of an impact wrench.

Because the tapping screw breaks at a low torque, the control of torque is necessary to keep the breaking torque to a predetermined level. In fact, however, the clamping torque is controlled by the operator depending on his perception. Thus, the work requires skill and the clamping torque is inevitably subject to variation even when the mounting is carried out by a skilled worker.

SUMMARY OF THE INVENTION

The present invention aims to provide a fastener which can be used in place of the tapping screw as stated above, and is capable of accomplishing mounting without relying on the operator's perception and with less variable fastening force.

In order to solve the above-mentioned problem, according to the present invention, a fastener comprises a stud and a nut. The stud according to the present invention comprises a shank having a breakable portion at a mid portion thereof, a resilient engagement section formed at one end of the shank, a nut engagement portion having circumferential grooves formed between the end of the shank and the breakable portion, and a flange disposed between the end of the shank and the nut engagement portion. The nut comprises an axial hole to allow the shank of the stud to pass therethrough, resilient engagement pawls on the inner wall of the axial hole for resilient engagements with the nut engagement portion of the stud and a flange receiving surface to abut upon the flange of the stud. In the fastener according to the present invention, the stud is inserted into holes of panels with the engagement section being firstly inserted into the holes of the panels and the stud is fitted in the axial hole of said nut with the flange receiving surface facing with the panels. Under this condition, the shank is drawn to break the breakable portion to complete attaching operation. When attached, the engagement section of the stud is resiliently bent into engagement with the rear surface of the panels. When the stud is drawn, the flange receiving surface of the nut abuts upon the stud flange to determine how the stud and the nut are positioned relative to each other. The flange receiving surface of the nut engages with the stud flange so as to prevent the engagement section of the stud from bending excessively. The stud and the nut are preferably made of resilient plastic material by molding.

In the present invention, it is preferred that the nut engagement portion of the stud is formed in a threaded profile. This enables the attached fastener to be removed and reused by rotating the nut. Further, it is preferable that the nut is formed with a positioning key groove axially extending along the inner wall of the axial hole, and the stud is formed with a radially protruding portion at a predetermined circumferential position for engagement with the key groove. Such structure enables the circumferential position of the nut to be fixed in a predetermined position with respect to the threaded groove of the stud, so that the engagement section of the attached stud is maintained in a predetermined amount of bending.

Further, in the present invention, it is preferred that the position of the breakable portion of the stud is determined so that the breakable portion is contained in the nut when the fastener has been attached. This structure prevents the stud from projecting from the top surface of the nut.

The fastener according to the present invention can be attached only by inserting the end of the stud into a panel hole and drawing the stud in its drawing direction to break a breakable portion of the stud. Its fastening force in the attachment state is maintained at a substantially predetermined level. Its mounting operation does not require skill. Further, as the shank is drawn out on the panel surface, the engagement section of the stud is always in engagement with the rear side of the panel. This allows its engagement to be maintained even when the panel thickness varies. Accordingly, the fastening force is kept at a high level regardless of various panels of different thicknesses.

DESCRIPTION OF THE PREFERRED EMBODIMENT

Figure 1:
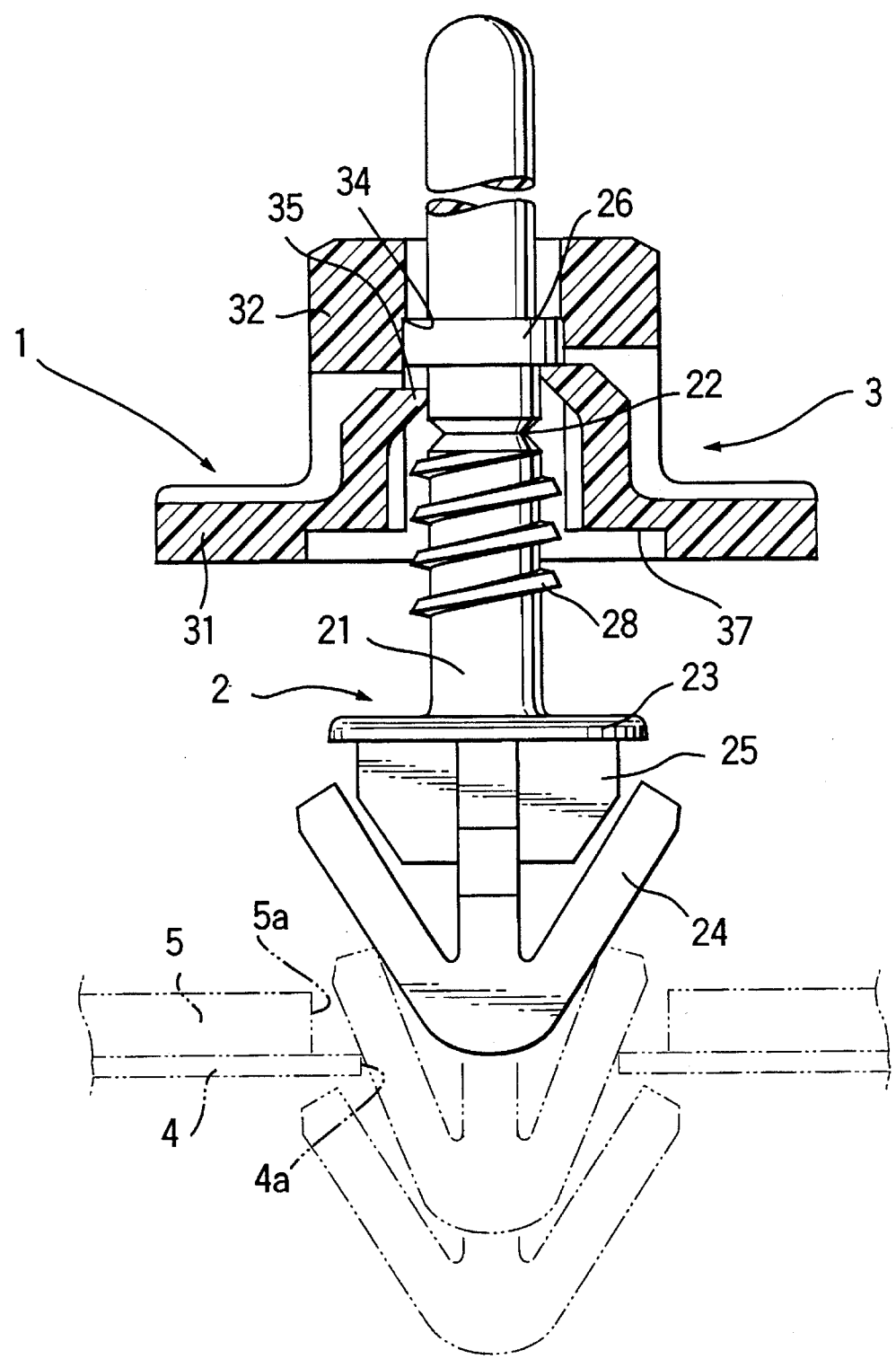
FIG. 1 is a partially sectional view showing the whole of a fastener of an embodiment according to the present invention.
Figure 2:
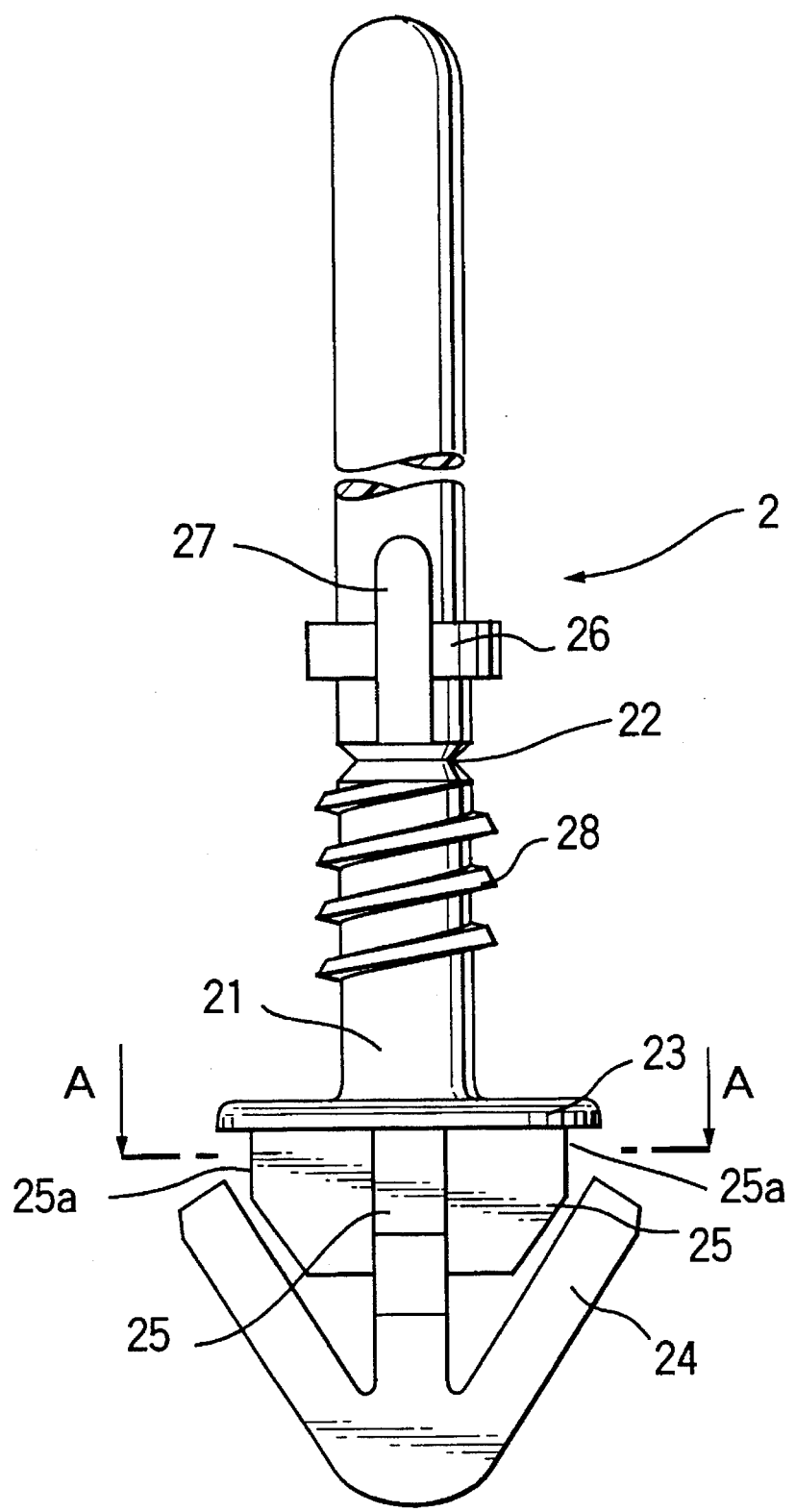
FIG. 2 is a side view showing the whole of a stud of the fastener of the embodiment in FIG. 1.
Figure 3:
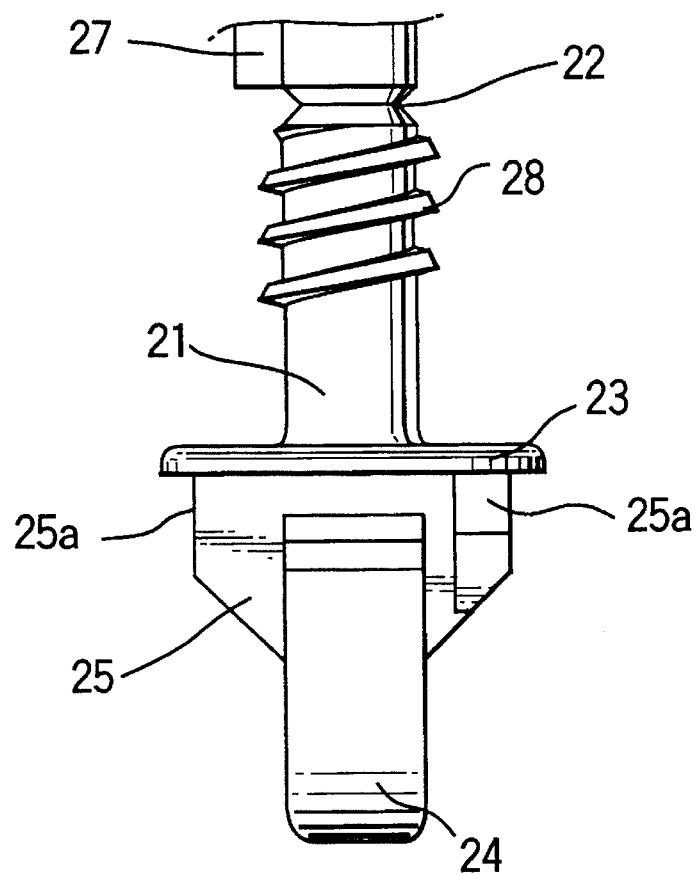
FIG. 3 is an another side view of a principal part of the stud shown in FIG. 2.
Figure 4:
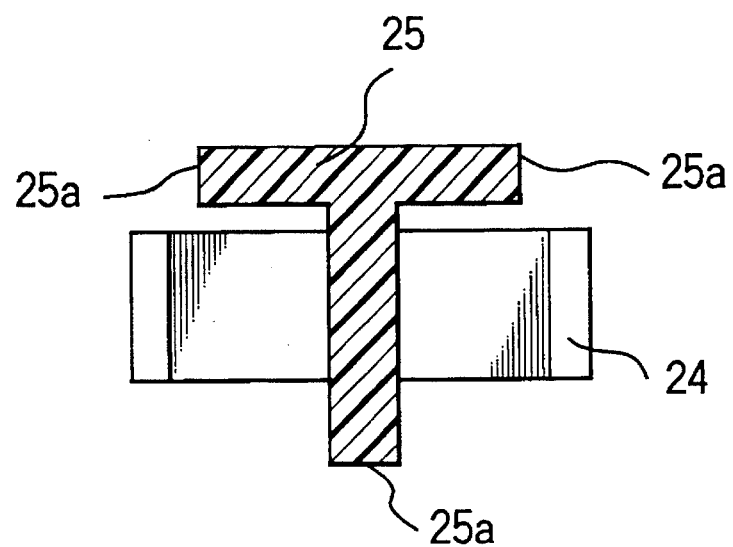
FIG. 4 is a sectional view taken along the line A—A of FIG. 2.

The present invention is described further by way of an embodiment, with reference to accompanying drawings. FIG. 1 is a partially sectional view of an embodiment of a fastener 1 according to the present invention. The fastener 1 comprises a stud 2 and a nut 3 produced by molding a plastic material which has resiliency. FIG. 2 shows a whole of the stud 2. The stud has a shank 21 and a mid portion of the shank 21 is formed with a breakable portion 22 which is a circumferential notch. In a position closer to an end of the shank 21, a circular flange 23 is formed. From the flange 23, an anchor-type resilient engagement section 24 extends. As shown in FIGS. 3 and 4, the resilient engagement section 24 is integrally connected to the flange 23 through a rotation prevention wall 25 which is formed in a T-shaped sectional configuration.

The shank 21 is formed with a threaded portion 28 extending along a predetermined length from the lower side of the breakable portion 22. Above the breakable portion 22, the shank 21 is also formed with a circular stopper 26 which radially outwardly expands throughout the circumference. A longitudinally extending key projection 27 is formed on the upper portion from the breakable portion 22. The T-shaped section and rotation-preventive wall 25 has end surfaces 25a extending vertically. The end surfaces 25a engage with a square hole formed in a panel to prevent the stud 2 from rotating after the fastener has been attached.

Figure 5:
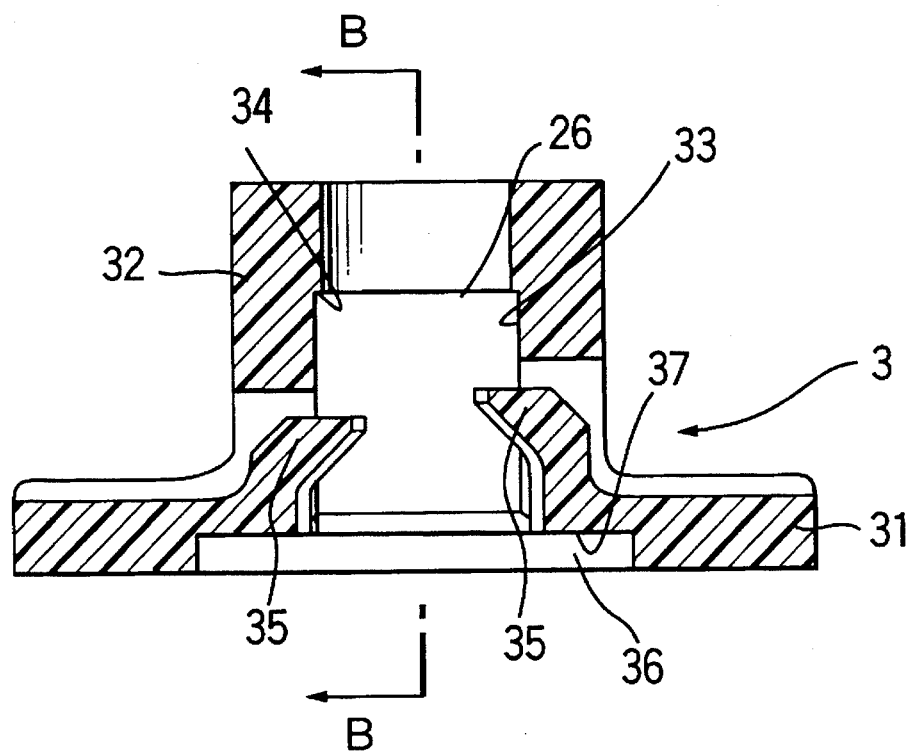
FIG. 5 is a sectional view of a nut of the fastener of the embodiment in FIG. 1.
Figure 6:
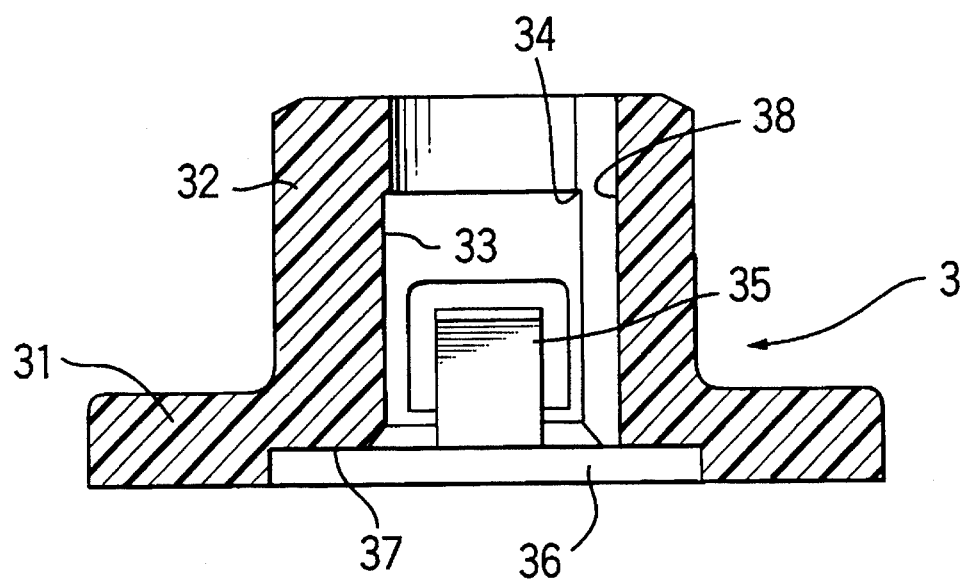
FIG. 6 is a sectional view taken along the line B—B of FIG. 5.

FIGS. 5 and 6 are sectional views showing a nut 3 in detail. The nut 3 has a flange portion 31 and a polygonal tubular portion 32 formed integrally with the flange portion 31. The polygonal tubular portion 32 is formed with an axial hole 33 of a generally circular profile in section passing throughout the tubular portion. At a mid portion of the axial hole 33, a thin step portion 34 is formed to make the upper portion of the axial hole 33 diametrically smaller than the lower portion. At a portion closer to the flange portion 31 in the polygonal tubular portion 32 of the nut 3, openings penetrating the walls of the tubular portion 32 are formed at diametrically opposite positions. In these openings, a pair of resilient engagement pawls 35 are formed so that their ends project radially inwardly from the inner walls of the axial hole 33. Each of the engagement pawls 35 is so formed that it rises from the flange portion 31 and its end projects into the axial hole 33. On the bottom of the flange 31, a circularly recessed portion 36 is not indispensable, and a flat bottom of the flange portion 31 may be used as the flange receiving surface. As shown in FIG. 6, a longitudinally extending key groove 38 is formed on the inner wall of the axial hole 33 of the nut 3.

Referring to FIG. 1 again, the fastener 1 is assembled so that the key 27 of the stud 2 is brought into engagement with the key groove 38 formed on the inner wall of the axial hole 33 of the nut 3 and the shank 21 of the stud 2 is fitted into the axial hole 33 of the nut 3. In this state, the stopper 26 of the stud 2 is in engagement with the thin step portion 34 formed in the axial hole 33 of the nut 3 as shown in FIG. 1. This engagement can prevent the nut 3 from being pressed further into the stud 2.

In FIG. 1, a reference numeral 4 designates a panel, in which a square hole 4a is formed for attachment. What is to be attached is a second panel 5. The second panel 5 is formed with a slightly larger hole 5a than the hole 4a of the first panel 4. Either of the holes 4a and 5a is formed as a square hole to prevent the shank 21 from rotating. The second panel 5 is placed so that its hole 5a is aligned with the hole 4a of the first panel 4. In this state, the fastener 1 is attached to them. Upon attaching the fastener 1, as shown in FIG. 1, the stud 2 is inserted into the holes 4a and 5a with the anchor-type engagement section entering the holes first. In this insertion, the engagement section 24 is bent resiliently during passing through the hole 4a. Once the engagement section 24 has passed through the hole 4a, owing to the resilience, the engagement section returns to the open state to come into engagement with the rear side of the first panel 4. In this position, the fastener 1 is in a temporarily fixed state.

Then, further pressing of the nut 3 allows the step portion 34 of the nut to get over the stopper 26 and the engagement pawls 35 begin to come into engagement with the threaded portion 28. In the temporarily fixed state prior to pressing of the nut, the step portion 34 of the nut is associated with the stopper 26 to prevent the engagement pawls 35 from coming into unintended engagement with the threaded portion 28.

Figure 7:
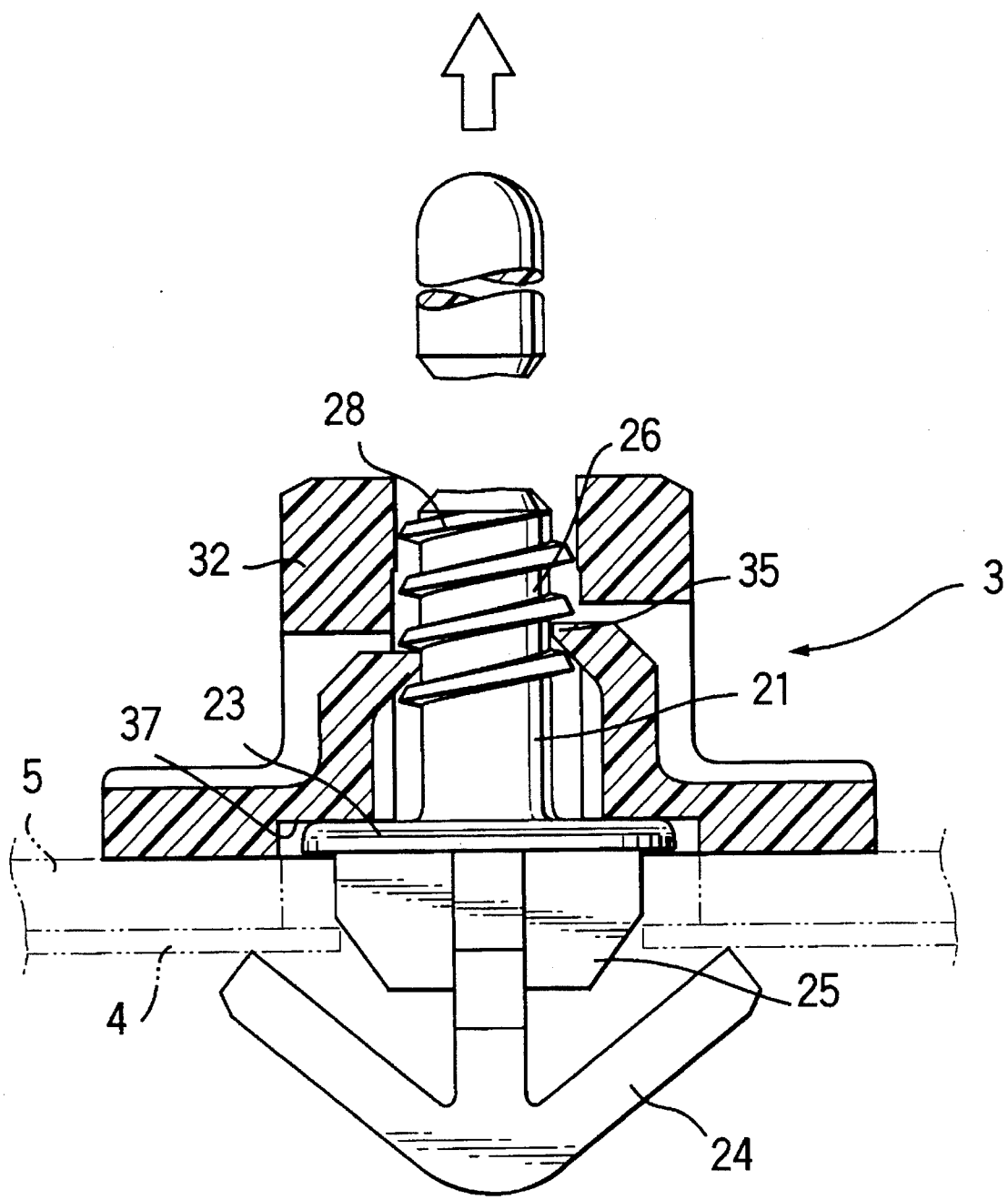
FIG. 7 is a sectional view showing the attachment state of the fastener of the embodiment in FIG. 1.

The shank 21 of the stud 2 is drawn as shown by an arrow in FIG. 7 while the flange portion 31 of the nut 3 is urged against the second panel 5. This may be done by using a swaging tool or similar tool for a normal blind rivet. When the stud 2 is drawn in the direction indicated by the arrow, the flange 23 of the stud 2 abuts upon the flange receiving surface 37 of the nut 3. Until this state is accomplished, the engagement section 24 is resiliently bent and is open as shown in FIG. 7. Owing to such bending of the engagement section 24, the fastener can deal with various attachment members of different thicknesses. The flange 23 of the stud 2 is engaged with the flange receiving surface 37 of the nut 3 to prevent the stud 2 from being further drawn out relative to the nut 3, so that the amount of bending of the resilient engagement section 24 is maintained substantially at a predetermined level.

When the stud 2 is pulled out to the above-mentioned position, the engagement pawls 35 of the nut 3 are engaged with a groove between the crests of the threaded portion 28 of the stud 2. Upon exerting further pulling force to the stud, it is broken at the breakable portion 22 as shown in FIG. 7. It is preferable to determine the position of the breakable portion so that the end of the stud 2 is contained in the nut 3. In this state, the fastener 1 is attached so as to sandwich and hold the first panel 4 and the second panel 5 between the flange 31 of the nut 3 and the engagement section 24 of the stud 2.

As discussed above, since the flange 23 of the stud 2 engages with the flange receiving surface 37 of the nut 3 to maintain the amount of bending of the engagement section 24 at a substantially predetermined level, the holding force is also maintained at a substantially predetermined level. As the fastener 1 can be attached simply by drawing the stud 2 in the direction indicated by the arrow in FIG. 7 by means of a tool, no skillful operation is required.

Figure 8:
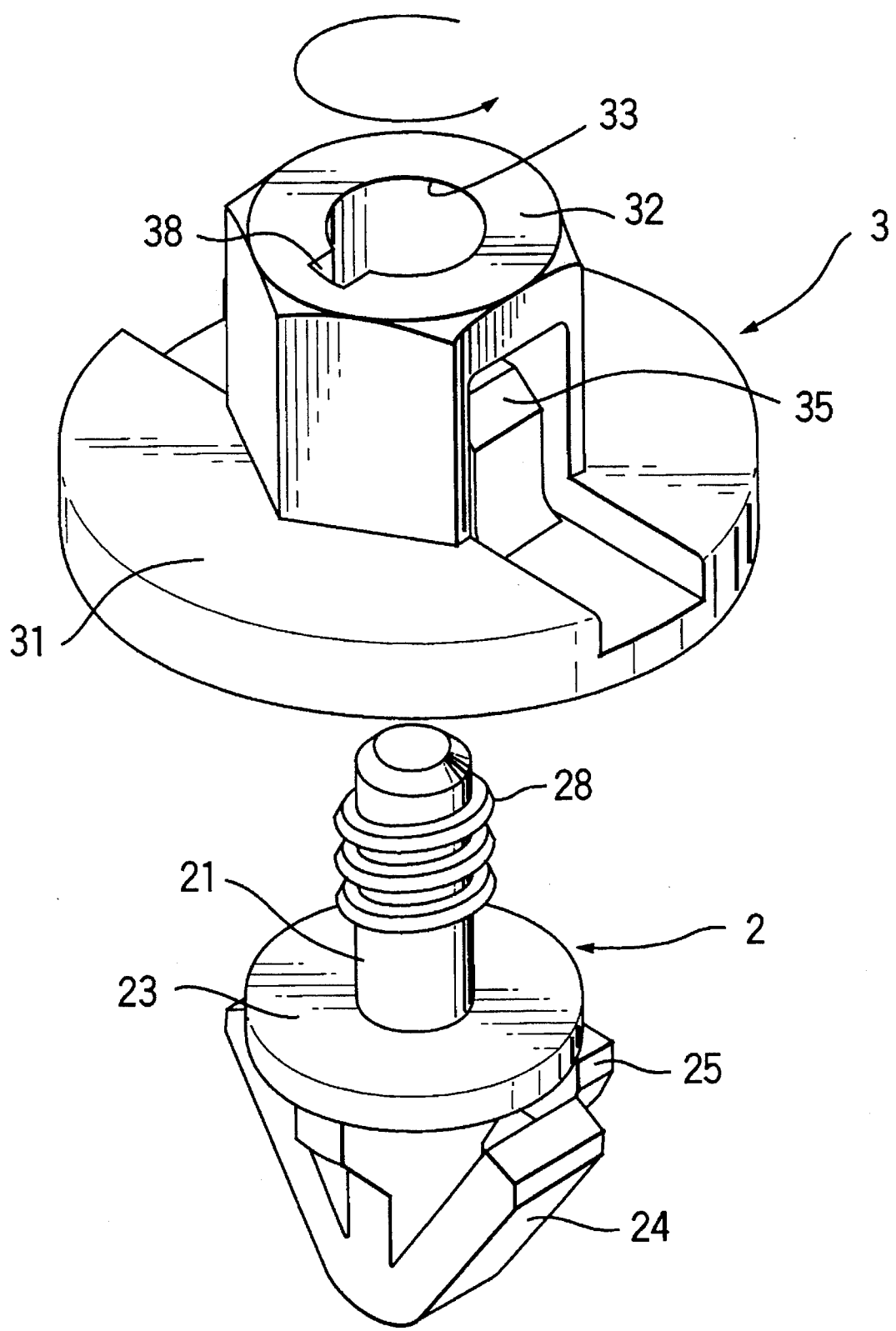
FIG. 8 is a perspective view showing that the fastener of the embodiment in FIG. 1 is detached after its attachment.

If the fastener 1 needs to be detached, the nut 3 is rotated in the direction indicated by an arrow in FIG. 8.

At this time, the end surfaces 25a of the rotation preventive wall 25 engages with the hole 4a of the first panel 4 to prevent the stud 2 from rotating. Thus, the nut 3 can be detached from the stud without difficulty. In FIG. 8, the nut 3 has been detached from the stud 2. For re-using the fastener, the nut 3 is rotated in a direction opposite to the direction indicated by the arrow in FIG. 8. This brings the engagement portion of the nut into engagement with the threaded portion of the stud with the same effect as the drawing of the shank 21, whereby the fastener can be re-used.

I claim:

1. A push-in fastener for releasably securing a plurality of panels, said fastener comprising:

a stud including a shank having a breakable portion at mid-section thereof, a resilient engagement section formed at one end of the shank for engaging a rear surface of the panels, a nut engagement portion having circumferential grooves formed between said end of the shank and said breakable portion, and a flange disposed between said end of the shank and said nut engagement portion; and a nut having an axial hole to allow the shank of the stud to pass therethrough, resilient engagement pawls on the inner wall of said axial hole for resilient engagement with said nut engagement portion of said stud, and a flange-receiving surface to abut said flange of said stud; and so that when said stud is inserted into holes in the panels with the engagement section positioned behind a rear surface thereof, and said nut is fitted on said stud with said flange-receiving surface facing the panels, said nut is adapted to be moved into engagement with said panels by pulling on said shank while pressing on said nut until said breakable portion breaks.

2. The fastener according to claim 1 wherein said nut engagement portion of said stud is formed in a threaded profile.

3. The fastener according to claim 2 wherein said nut is formed with a positioning key groove axially extending along the inner wall of the axial hole, and said stud is formed with a corresponding radially protruding portion at a predetermined circumferential position for engagement with the key groove.

4. A fastener according to claim 1 wherein the position of said breakable portion of said stud is determined so that the portion of said shank remaining above the panels after said breakable portion has been removed is contained within said axial hole in said nut.

* * * * *